United States Patent [19]

Mimura

[11] Patent Number: 5,761,010
[45] Date of Patent: Jun. 2, 1998

[54] MAGNETORESISTIVE HEAD, MANUFACTURING METHOD OF THE HEAD AND MAGNETIC RECORDING/ REPRODUCING DRIVE

[75] Inventor: Takashi Mimura, Kanagawa, Japan

[73] Assignee: Fujitsu Limited, Kawasaki, Japan

[21] Appl. No.: 682,097

[22] Filed: Jul. 17, 1996

[30] Foreign Application Priority Data

Aug. 31, 1995 [JP] Japan .................................. 7-222940

[51] Int. Cl.$^6$ ...................................................... G11B 5/33
[52] U.S. Cl. ........................................................ 360/113
[58] Field of Search ............................ 360/113; 338/32 R; 324/252

[56] References Cited

U.S. PATENT DOCUMENTS

| | | | |
|---|---|---|---|
| 4,755,897 | 7/1988 | Howard | 360/113 |
| 4,809,109 | 2/1989 | Howard et al. | 360/113 |
| 4,825,325 | 4/1989 | Howard | 360/113 |
| 5,192,618 | 3/1993 | Frankel et al. | 360/113 X |
| 5,258,884 | 11/1993 | Howard et al. | 360/113 |
| 5,438,470 | 8/1995 | Ravipati et al. | 360/113 |
| 5,508,866 | 4/1996 | Gill et al. | 360/113 |

FOREIGN PATENT DOCUMENTS

| | | |
|---|---|---|
| 0314343 | 5/1989 | European Pat. Off. . |
| 0634740 | 1/1995 | European Pat. Off. . |
| 3152707 | 6/1991 | Japan . |
| 554337 | 3/1993 | Japan . |
| 714125 | 1/1995 | Japan . |
| 76330 | 1/1995 | Japan . |
| 744825 | 2/1995 | Japan . |
| 7098822 | 8/1995 | Japan . |
| 7220246 | 8/1995 | Japan . |

OTHER PUBLICATIONS

C. Tsang, N. Heiman and Kenneth Lee—Exchange induced unidirectional anisotropy at FeMn–$Ni_{80}Fe_2o$ interfac Journal of Applied Physics, vol. 52, No. 3, pp. 2471-2473—Mar. 1991.

Junichi Kane, Hitoshi Kanai, Hitoshi Takagi and Kazuo Kobayashi—"A study of Exchange Coupled NiFe/FeMn thin films for use in MR heads"—Japan Spring Meeting of Electronic Information Communication Society in 199 C–428.

H. Nagai and S. Tanoue—Effect of interface characteristics on Exchange coupling in NiFe/FeMn Bilayer Films Journal of the magnetics society of Japan, vol. 17, No. 2, pp. 315-318, 1993.

Primary Examiner—Stuart S. Levy
Assistant Examiner—William J. Klimowicz
Attorney, Agent, or Firm—Greer, Burns & Crain, Ltd.

[57] ABSTRACT

A magnetoresistive head is composed of a soft magnetic layer formed on a substrate, a magnetic isolation layer formed on the soft magnetic layer, a magnetoresistive layer formed on the magnetic isolation layer, and a magnetic domain controlling magnetic layer, which is made of an anti-ferromagnetic layer or a hard ferromagnetic layer having a magnetically nonactive thickness, for covering a sense region of the magnetoresistive layer. Accordingly, because the magnetic domain controlling magnetic layer grows on the magnetoresistive layer in succession to the growth of the magnetoresistive layer, there is no probability that a natural oxide is produced in a boundary region between the magnetoresistive layer and the magnetic domain controlling magnetic layer. Also, there is no probability that a film thickness of the magnetoresistive layer placed under the magnetic domain controlling magnetic layer changes. Therefore, an exchange coupling magnetic field of the magnetic domain controlling magnetic layer for the magnetoresistive layer can be stabilized, a Barkhausen noise can be suppressed, and a superior magnetoresistive effect characteristic can be stably obtained.

6 Claims, 7 Drawing Sheets

MAGNETORESISTIVE HEAD, MANUFACTURING METHOD OF THE HEAD AND MAGNETIC RECORDING/REPRODUCING DRIVE

BACKGROUND OF THE INVENTION

1. Field of the Invention

The present invention relates generally to a magnetoresistive head, a manufacturing method of the head and a magnetic recording/reproducing drive, and more particularly to a magnetoresistive head made of an anti-ferromagnetic film or a hard ferromagnetic film for controlling a magnetic domain of a magnetoresistive sense region, a manufacturing method of the head and a magnetic recording/reproducing drive with the magnetoresistive head.

2. Description of the Prior Art

A magnetoresistive head has been put to practical use as a magnetic head for reading out information written in a magnetic recording medium. The magnetoresistive head is operated according to a magnetoresistive effect of a soft ferromagnetic film made of permalloy or the like, and a large reproducing output of the information can obtain.

A fundamental manufacturing method of the magnetoresistive head is, for example, disclosed in Published Unexamined Japanese Patent Applications 6330/1995 (H7-6330) and 14125/1995 (H7-14125). An example of a manufacturing method of the magnetoresistive head is described with reference to FIGS. 1A to 1C.

Figure 1A:
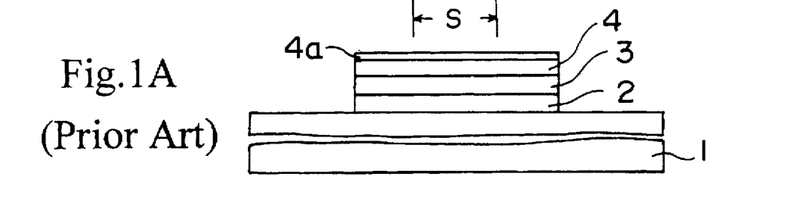
FIGS. 1A to 1D are cross-sectional views showing a plurality of steps for forming a plurality of films in a conventional magnetoresistive sensor.

A procedure for manufacturing layers shown in FIG. 1A is initially described.

A soft adjacent layer 2 made of a soft ferromagnetic substance, a magnetic isolation layer 3, a magnetoresistive layer 4 made of a soft ferromagnetic substance are successively formed on a substrate 1 in that order according to a vacuum deposition technique. The soft adjacent layer 2 and the magnetoresistive layer 4 are, for example, made of NiFe. The magnetic isolation layer 3 is made of an insulating material such as $Al_2O_3$ or a high-resistance metal such as tantalum or titanium. Thereafter, the soft adjacent layer 2, the magnetic isolation layer 3 and the magnetoresistive layer 4 are patterned in a plane rectangular shape according to a photolithography technique.

Figure 1B:
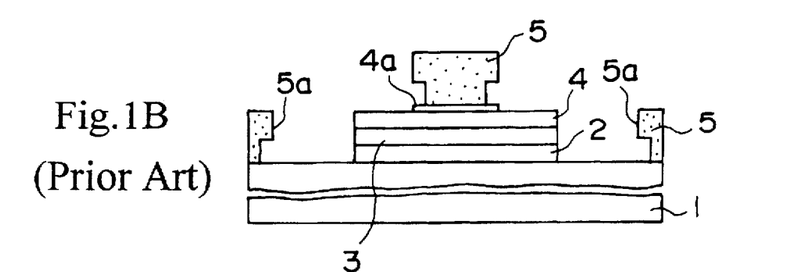

Thereafter, as shown in FIG. 1B, resist 5 is coated on the magnetoresistive layer 4 and the substrate 1, and the resist 5 is exposed to light and is developed. Therefore, a plurality of opening portions 5a are formed in a plurality of leading electrode forming regions placed at both sides of a sense region S of the magnetoresistive layer 4.

Figure 1C:
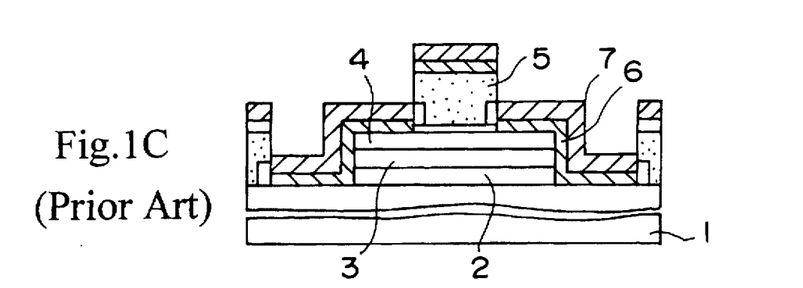
Figure 1D:
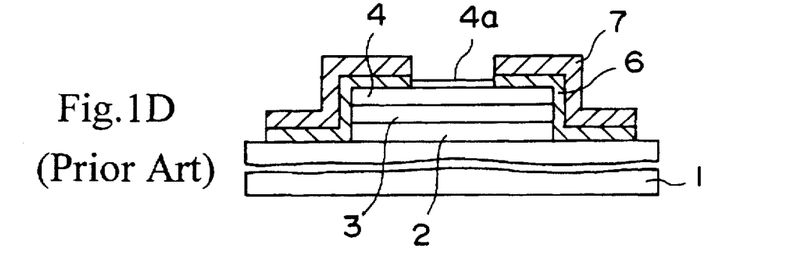

Thereafter, as shown in FIG. 1C, a magnetic domain controlling magnetic layer 6 made of a hard ferromagnetic film or an anti-ferromagnetic film is deposited on the resist 5, the magnetoresistive layer 4 and the substrate 1, and a terminal forming metal film 7 is deposited on the magnetic domain controlling magnetic layer 6. The anti-ferromagnetic film is, for example, made of FeMn or NiMn. The hard ferromagnetic film is, for example, made of Co, Cr, CoPt or CoCrPt.

Thereafter, the portions of magnetic domain controlling magnetic layer 6 and the terminal forming metal film 7 deposited on top of the resist 5 are removed with the resist 5 according to a lift-off technique, and the remaining magnetic domain controlling magnetic layer 6 and the terminal forming metal film 7 is in the leading electrode forming regions. The magnetic domain controlling magnetic layer 6 remains on both sides of the sense region S to control a magnetic domain of the sense region S of the magnetoresistive layer 4. The terminal forming metal film 7 placed on the magnetic domain controlling magnetic layer 6 functions as a plurality of leading electrodes. Electric current is supplied to the sense region S of the magnetoresistive layer 4 through the leading electrodes 7.

Because the magnetoresistive layer 4 is exposed to the atmosphere, as shown in FIG. 1A, a natural oxide film 4a is formed on the surface of the magnetoresistive layer 4. Because the magnetoresistive layer 4 undesirably prevents an exchange coupling between the magnetoresistive layer 4 and the magnetic domain controlling magnetic layer 6, a surface cleaning process such as an ion milling or a reverse sputtering is performed prior to the deposition of the magnetic domain controlling magnetic layer 6 to remove the natural oxide film 4a. Because of the performance of the surface cleaning process, an exchange coupling magnetic field having a function for suppressing a Barkhausen noise greatly changes in the magnetoresistive layer 4. Therefore, it is difficult to obtain a magnetoresistive sensor having stable characteristics.

One reason of the great change in the exchange coupling magnetic field is, for example, that a crystal grain having a specific crystalline plane is exposed on a surface of the ion-milled NiFe film and a crystal orientation of the crystal grain changes. The change of the crystal orientation depends on ion-milling conditions such as an ion incident angle. The change of the crystal orientation is described in Journal of the Magnetics Society of Japan, Vol. 17, No. 2, pp. 315–318, 1993.

Also, another reason of the great change in the exchange coupling magnetic field is that a film thickness of the magnetoresistive layer 4 changes because the surface of the magnetoresistive layer 4 is cleaned according to the surface cleaning process. The intensity of the exchange coupling magnetic field is inversely proportional to the film thickness of the magnetoresistive layer 4, and this inversely proportional relationship is, for example, described in Journal of Applied Physics, Vol. 52, No. 3, pp. 2471–2473, 1981.

In the Published Unexamined Japanese Patent Application 14125/1995 (H7-14125), a magnetoresistive layer and an anti-ferromagnetic layer are successively formed in that order, and a method that the contamination of extraneous material in a boundary region between the magnetoresistive layer and the anti-ferromagnetic layer is prevented is disclosed. However, because a leading electrode is formed after the anti-ferromagnetic layer on a sense region of the magnetoresistive layer is removed in this application, there is a probability that the anti-ferromagnetic layer is exposed to the atmosphere in cases where the leading electrode is not accurately placed at a correct position.

Therefore, there is a probability that the anti-ferromagnetic layer is oxidized and the exchange coupling between the magnetoresistive layer and the anti-ferromagnetic layer is disturbed. Also, because the leading electrode is formed after the removal of the anti-ferromagnetic layer of the sense region, a surface of the anti-ferromagnetic layer of the sense region is necessarily exposed to the atmosphere after the formation of the leading electrode. Therefore, when various processes are performed after the formation of the leading electrode, the surface of the anti-ferromagnetic layer is gradually oxidized, and one or more magnetic fine grains are attached to the surface of the anti-ferromagnetic layer. Accordingly, the occurrence of various causes that the reliability for the magnetoresistive head is lowered cannot be prevented.

SUMMARY OF THE INVENTION

A first object of the present invention is to provide, with due consideration to the drawbacks of such a conventional magnetoresistive head, a conventional manufacturing method of the head and a conventional magnetic recording/reproducing drive, a magnetoresistive head in which the Barkhausen noise is suppressed and electromagnetic characteristics such as a magnetoresistive effect characteristic are stably obtained, a manufacturing method of the magnetoresistive head and a magnetic recording/reproducing drive with the magnetoresistive head.

Another object of the present invention is to provide a magnetoresistive head in which a surface of a sense region of a magnetoresistive layer is maintained in a clean condition just after the formation of a leading electrode, a manufacturing method of the magnetoresistive head and a magnetic recording/reproducing drive with the magnetoresistive head.

In a first concept of the present invention, after a magnetoresistive layer and a magnetic domain controlling magnetic layer are successively formed, a pair of leading electrodes are formed on both sides of the magnetic domain controlling magnetic layer, the magnetic domain controlling magnetic layer is removed while using the leading electrodes as an etching mask, and a sense region of the magnetoresistive layer is exposed.

Accordingly, because the magnetic domain controlling magnetic layer grows on the magnetoresistive layer in succession to the growth of the magnetoresistive layer there is no probability that a natural oxide is produced in a boundary region between the magnetoresistive layer and the magnetic domain controlling magnetic layer. Also, there is no probability that a film thickness of the magnetoresistive layer placed under the magnetic domain controlling magnetic layer changes. Therefore, an exchange coupling magnetic field of an anti-ferromagnetic layer for the magnetoresistive layer can be stabilized, the Barkhausen noise can be suppressed, and a superior magnetoresistive effect characteristic can be stably obtained.

Also, because the anti-ferromagnetic layer is patterned by using the leading electrodes as the etching mask, the sense region of the magnetoresistive layer is clearly determined along ends of the leading electrodes, and end portions of the leading electrodes agree with end portions of the sense region. Therefore, the exposure of the anti-ferromagnetic layer can be prevented, and a magnetoresistive sensor can be manufactured with high precision.

In addition, in cases where the magnetoresistive layer, the magnetic domain controlling magnetic layer and an electrode forming metal layer are successively formed, the contamination of a surface of the magnetic domain controlling magnetic layer can be prevented, the exchange coupling magnetic field of the anti-ferromagnetic layer for the magnetoresistive layer can be moreover stabilized, and a more superior magnetoresistive effect characteristic can be stably obtained.

In a second concept of the present invention, a sense region placed at the center of a magnetoresistive layer composing a magnetoresistive head is covered with an anti-ferromagnetic film or a hard ferromagnetic film, and a film thickness of the anti-ferromagnetic film or the hard ferromagnetic film is adjusted to set the anti-ferromagnetic film or the hard ferromagnetic film in a magnetically non-active condition. Accordingly, because there is no probability that the sense region of the magnetoresistive layer is oxidized or contaminated, the reliability for the magnetoresistive head can be heightened. In this case, the magnetically non-active condition means that a exchange coupling between the magnetoresistive layer and the anti-ferromagnetic film (or the hard ferromagnetic film) does not occur and any magnetic influence of the anti-ferromagnetic film (or the hard ferromagnetic film) is not exerted on the magnetoresistive layer.

To obtain the magnetically non-active condition, after the anti-ferromagnetic film or the hard ferromagnetic film used to control a magnetic domain of the sense region is formed on the magnetoresistive layer in succession to the formation of the magnetoresistive layer, the anti-ferromagnetic film or the hard ferromagnetic film placed on the sense region of the magnetoresistive layer is thinned. The magnetic domain control for the sense region is performed by the exchange coupling between the anti-ferromagnetic film (or the hard ferromagnetic film) and the magnetoresistive layer placed on both sides of the sense region.

Accordingly, because the magnetoresistive layer is not exposed after the anti-ferromagnetic film or the hard ferromagnetic film is formed on the magnetoresistive layer, the entire upper surface of the magnetoresistive layer can be protected while maintaining the entire upper surface in a clean condition, and a magnetoresistive layer head having a superior reliability can be manufactured.

Also, in cases where the anti-ferromagnetic film or the hard ferromagnetic film is gradually thinned while observing electro-magnetic characteristics of the magnetoresistive layer, a film thickness of the anti-ferromagnetic film or the hard ferromagnetic film can be controlled with high precision. For example, because a magnetoresistive behavior of the magnetoresistive layer for a constant applied magnetic field changes with the film thickness of the anti-ferromagnetic film or the hard ferromagnetic film, in cases where the anti-ferromagnetic film or the hard ferromagnetic film is gradually thinned while observing the change of the magnetoresistive behavior of the magnetoresistive layer, the film thickness of the anti-ferromagnetic film or the hard ferromagnetic film can be controlled with high precision.

In a third concept of the present invention, a sense region placed at the center of a magnetoresistive layer composing a magnetoresistive head is covered with an anti-ferromagnetic oxide film or a hard ferromagnetic oxide. Because the anti-ferromagnetic oxide film and the hard ferromagnetic oxide film have a magnetically non-active property, there is no probability that the sense region of the magnetoresistive layer is oxidized or contaminated, and the reliability for the magnetoresistive head can be heightened.

To obtain the magnetoresistive head with the anti-ferromagnetic oxide film or the hard ferromagnetic oxide film, after the anti-ferromagnetic film or the hard ferromagnetic film used to control a magnetic domain of the sense region is formed on the magnetoresistive layer a part of the anti-ferromagnetic film or the hard ferromagnetic film placed just on the sense region of the magnetoresistive layer is oxidized.

Accordingly, because the magnetoresistive layer is not exposed after the anti-ferromagnetic film or the hard ferromagnetic film is formed on the magnetoresistive layer, the entire upper surface of the magnetoresistive layer can be protected while maintaining the entire upper surface in a clean condition, and a magnetoresistive layer head having a superior reliability can be manufactured.

DESCRIPTION OF THE PREFERRED EMBODIMENTS

Preferred embodiments of a magnetoresistive head, a manufacturing method of the head and a magnetic recording/reproducing drive according to the present invention are described with reference to drawings.

(First Embodiment)

A manufacturing method of a magnetoresistive head according to a first embodiment of the present invention is described.

Figure 2A:
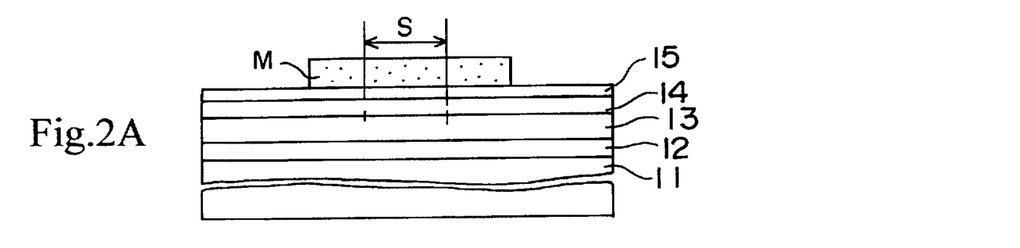
FIGS. 2A to 2E are cross-sectional views showing a plurality of steps for forming a plurality of films in a magnetoresistive sensor device according to a first embodiment of the present invention.

As shown in FIG. 2A, a soft adjacent layer 12 made of a soft ferromagnetic substance, a magnetic isolation layer 13 made of an insulating material or a high-resistance metal, a magnetoresistive layer 14 made of a soft ferromagnetic substance and an anti-ferromagnetic layer (or a magnetic domain controlling magnetic layer) 15 are successively formed on a substrate 11 in that order according to a RF sputtering. Also, a magnetic field having an intensity of about 1000 oersteds (Oe) is applied on the layers 12 to 15 in the easy direction of magnetization during the RF sputtering, and the soft adjacent layer 12 and the magnetoresistive layer 14 are magnetized in the same magnetization direction. Also, the anti-ferromagnetic layer 15 is set in a condition for fixing the magnetization direction of the magnetoresistive layer 14 placed under the anti-ferromagnetic layer 15. The RF (radio frequency) sputtering is performed in an argon gas atmosphere in which the pressure of the argon gas is set to about $10^{-2}$ torr. The RF sputtering is performed for other embodiments in the same argon gas atmosphere.

As an example, materials and film thicknesses of the layers are as follows. The soft adjacent layer 12 is made of $Ni_{80}Fe_{20}$ and has a film thickness of 20 nm, the magnetic isolation layer 13 is made of insulating material such as $Al_2O_3$ and has a film thickness of 50 nm, the magnetoresistive layer 14 is made of $Ni_{80}Fe_{20}$ and has a film thickness of 20 nm, and the anti-ferromagnetic layer 15 is made of $Fe_{50}Mn_{50}$ and has a film thickness of 15 nm.

In the upper portion of the substrate 11, a first non-magnetic insulating layer, a shielding layer and a second non-magnetic insulating layer are formed. The configuration of the substrate 11 is the same as those in other embodiments.

Figure 2B:
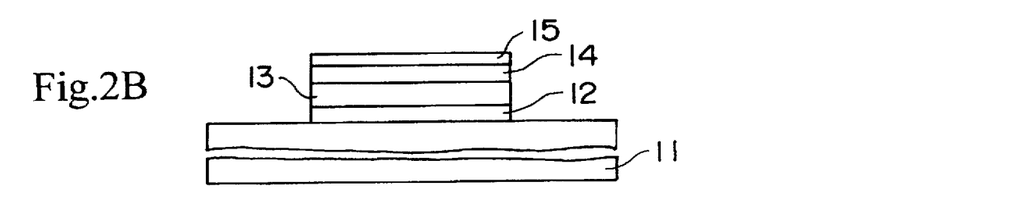

After a patterned photoresist M is formed as an etching mask on the anti-ferromagnetic layer 15, as shown in FIG. 2B, the soft adjacent layer 12, the magnetic isolation layer 13, the magnetoresistive layer 14 and the anti-ferromagnetic layer 15 are patterned in a plane rectangular shape according to a photolithography technique to form patterned layers 12 to 15 placed under the patterned photoresist M. In this case, a longitudinal direction of the patterned layers 12 to 15 patterned in the plane rectangular shape agrees with the magnetization direction determined by the applied magnetic field.

Figure 2C:
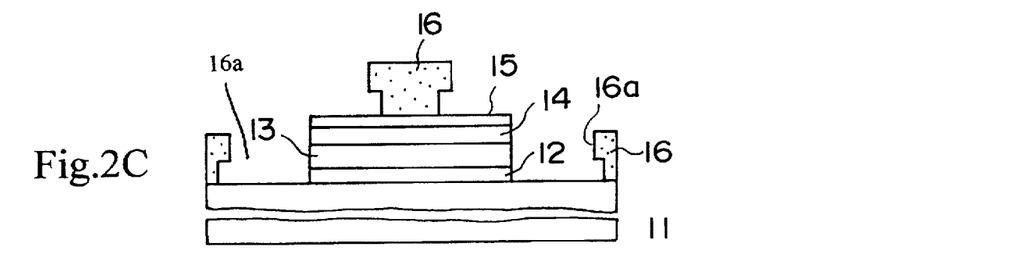

Thereafter, a resist is coated on the anti-ferromagnetic layer 15 and the substrate 11, the resist is exposed to light, the exposed resist is developed, and a plurality of patterned resists 16 shown in FIG. 2C are formed on the anti-ferromagnetic layer 15 and the substrate 11. As shown in FIG. 2C, the anti-ferromagnetic layer 15 on a sense region S of the magnetoresistive layer 14 is covered with one of the patterned resists 16, and a pair of opening portions 16a are formed in two leading electrode forming regions placed on both sides of the sense region S. Each of the patterned resists 16 has an overhung upper portion.

Figure 2D:
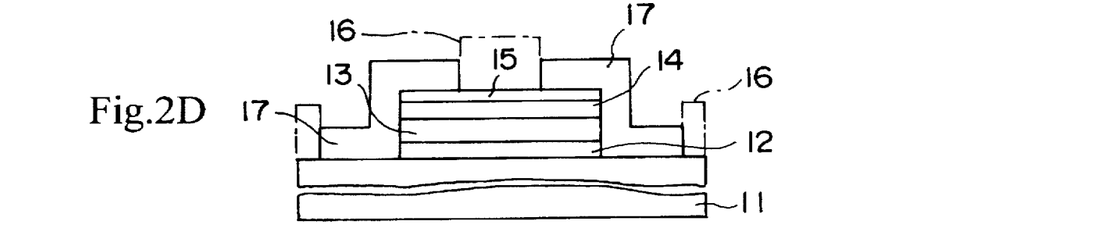

Thereafter, a low-resistance metal film 17 made of gold is deposited on uncovered portions of the patterned resists 16, the anti-ferromagnetic layer 15 and the substrate 11. Thereafter, the low-resistance metal film 17 formed on the patterned resists 16 is removed with the patterned resists 16 according to a lift-off technique. That is, the low-resistance metal film 17 formed on the anti-ferromagnetic layer 15 and the substrate 11 remains in the leading electrode forming regions as a pair of patterned low-resistance metal films. Therefore, as shown in FIG. 2D, the patterned low-resistance metal films are arranged as a pair of leading electrodes 17 placed on both sides of the sense region S. In this case, the leading electrodes 17 are aligned in a direction agreeing with the magnetization direction determined by the applied magnetic field.

Figure 2E:
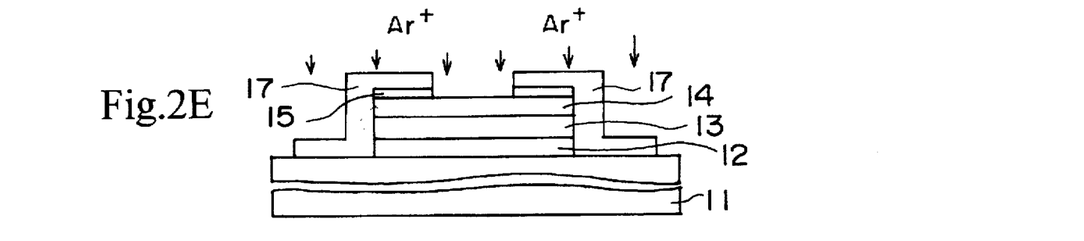

Thereafter, as shown in FIG. 2E, the anti-ferromagnetic ($Fe_{50}Mn_{50}$) layer 15 placed on the sense region S of the magnetoresistive layer 14 is removed according to an ion milling technique while using the leading electrodes 17 as an etching mask, and the sense region S of the magnetoresistive layer 14 is exposed. In the ion milling technique, argon (Ar) gas is used, an accelerating voltage for ions is set to 1 keV, and an ion current density is set to 1 $mA/cm^2$. In this case, because the leading electrodes 17 are undesirably etched when the anti-ferromagnetic layer 15 is etched, the leading electrodes 17 are excessively thickened in the initial formation of the leading electrodes 17 to compensate for the undesired etching of the leading electrodes 17.

In the above manufacturing method, the formation of a magnetoresistive sensor used for the manufacturing of a magnetoresistive head is finished.

Accordingly, in the magnetoresistive sensor, because the anti-ferromagnetic layer 15 is in contact with only both sides regions of the sense region S of the magnetoresistive layer 14, the anti-ferromagnetic layer 15 can be formed on the magnetoresistive layer 14 in succession to the formation of the magnetoresistive layer 14, and the layers 14 and 15 can be simultaneously patterned. Therefore, because the anti-ferromagnetic layer 15 grows on the magnetoresistive layer 14 in succession to the growth of the magnetoresistive layer 14, there is no probability that a natural oxide is produced in a boundary region between the magnetoresistive layer 14 and the anti-ferromagnetic layer 15. Also, there is no probability that a film thickness of the magnetoresistive layer 14 placed under the anti-ferromagnetic layer 15 changes. Therefore, an exchange coupling magnetic field of the anti-ferromagnetic layer 15 for the magnetoresistive layer 14 can be stabilized, the Barkhausen noise can be suppressed, and a superior magnetoresistive effect characteristic can be stably obtained in the magnetoresistive sensor.

Also, because the anti-ferromagnetic layer 15 is patterned by using the leading electrodes 17 as an etching mask, the sense region S of the magnetoresistive layer 14 can be clearly determined along ends of the leading electrodes 17, and end portions of the leading electrodes 17 agree with end portions of the sense region. Therefore, the exposure of the anti-ferromagnetic layer 15 can be prevented, the oxidation of the anti-ferromagnetic layer 15 can be prevented, and the magnetoresistive sensor can be manufactured with high precision.

In the above configuration and the electromagnetic characteristics of the magnetoresistive sensor, when an electric current is supplied to the sense region S of the magnetoresistive layer 14 though the leading electrodes 17, a biasing magnetic field is generated by the magnetoresistive layer 14 around the magnetoresistive layer 14, the magnetization direction of the soft adjacent layer 12 initially determined in the manufacturing method is changed to a magnetized bias direction by the biasing magnetic field.

It is preferred that a surface of the anti-ferromagnetic layer 15 exposed from the opening portions 16a of the patterned resists 16 be cleaned according to a reverse sputtering technique before the low-resistance metal film functioning as the leading electrodes 17 is deposited on the patterned resists 16, the anti-ferromagnetic layer 15 and the substrate 11. In this case, an electric contact resistance between the anti-ferromagnetic layer 15 and the leading electrodes 17 is reduced because of the cleaning of the anti-ferromagnetic layer 15.

(Second Embodiment)

A magnetoresistive head and a manufacturing method of the head according to a second embodiment of the present invention are described.

Figure 3A:
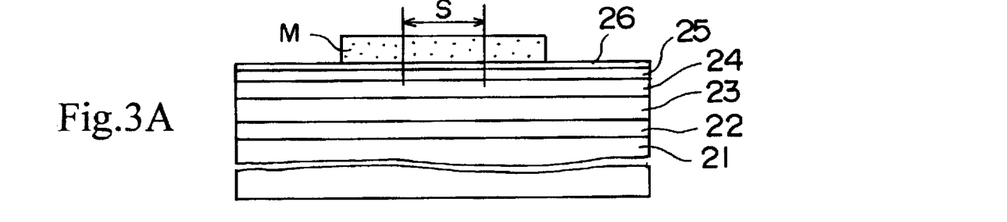
FIGS. 3A to 3E are cross-sectional views showing a plurality of steps for forming a plurality of films in a magnetoresistive sensor according to a second embodiment of the present invention.

As shown in FIG. 3A, a soft adjacent layer 22 made of a soft ferromagnetic substance, a magnetic isolation layer 23 made of an insulating film or a high-resistance metal film, a magnetoresistive layer 24 made of a soft ferromagnetic substance, an anti-ferromagnetic layer (or a magnetic domain controlling magnetic layer) 25 and a first low-resistance metal layer 26 are successively formed on a substrate 21 in that order according to the RF sputtering. Also, a magnetic field having an intensity of about 1000 Oe is applied on the layers 22 to 26 in easy direction of magnetization during the RF sputtering, and the soft adjacent layer 22 and the magnetoresistive layer 24 are magnetized in the same magnetization direction. Also, the anti-ferromagnetic layer 25 is set in a condition for fixing the magnetization direction of the magnetoresistive layer 24 placed under the anti-ferromagnetic layer 25.

As an example, materials and film thicknesses of the layers are as follows. The soft adjacent layer 22 is made of $Ni_{80}Fe_{20}$ and has a film thickness of 20 nm, the magnetic isolation layer 23 is made of $Al_2O_3$ and has a film thickness of 50 nm, the magnetoresistive layer 24 is made of $Ni_{80}Fe_{20}$ and has a film thickness of 20 nm, and the anti-ferromagnetic layer 25 is made of $Fe_{50}Mn_{50}$ and has a film thickness of 15 nm.

Figure 3B:
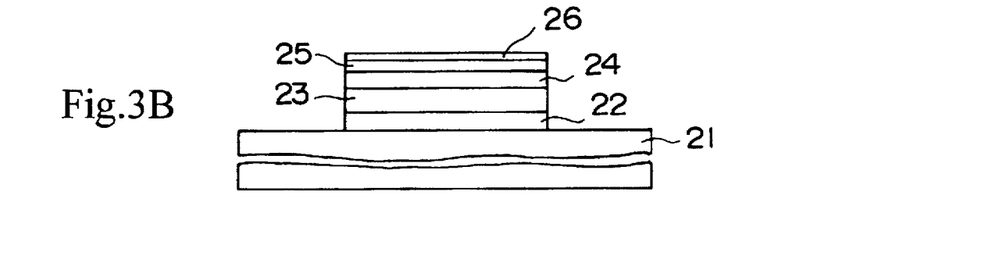

After a patterned photoresist M is formed as an etching mask on the first low-resistance metal layer 26, as shown in FIG. 3B, the layers 22 to 26 are patterned in a plane rectangular shape according to the photolithography technique to form patterned layers 22 to 25 placed under the patterned photoresist M. In this case, a longitudinal direction of the patterned layers 22 to 26 patterned in the plane rectangular shape agrees with the magnetization direction determined by the applied magnetic field.

Figure 3C:
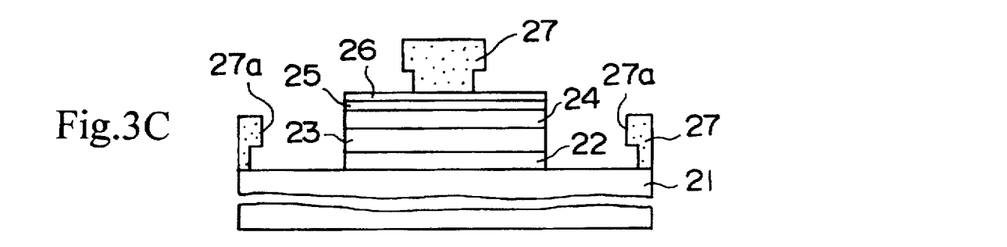

Thereafter, a resist is coated on the first low-resistance metal layer 26 and the substrate 21, the resist is exposed to light, the exposed resist is developed, and a plurality of patterned resists 27 shown in FIG. 3C are formed on the first low-resistance metal layer 26 and the substrate 21. As shown in FIG. 3C, the first low-resistance metal layer 26 placed above a sense region S of the magnetoresistive layer 25 is covered with one of the patterned resists 27, and a pair of opening portions 27a are formed in two leading electrode forming regions placed on both sides of the sense region S. Each of the patterned resists 27 has an overhung upper portion.

Thereafter, a surface of the first low-resistance metal layer 26 exposed from the opening portions 27a of the patterned resists 27 is cleaned according to the reverse sputtering technique before a low-resistance metal film functioning as a pair of leading electrodes is formed. Because of the cleaning of the first low-resistance metal layer 26, oxidized substance existing on the surface of the first low-resistance metal layer 26 is removed, a superior electric contact between the first low-resistance metal layer 26 and a second low-resistance metal layer formed in a following manufacturing step can be obtained. In this case, even though the surface of the first low-resistance metal layer 26 is sputtered, any adverse influence is not exerted on the electromagnetic characteristics of a magnetoresistive sensor.

Thereafter, a second low-resistance metal film 28 having a three-layer structure of Ta-W-Ta is deposited on exposed portions of the patterned resists 27, the first low-resistance metal layer 26 and the substrate 21. In this case, a lower Ta layer of the second low-resistance metal film 28 has a thickness of 10 nm, a W layer of the second low-resistance metal film 28 has a thickness of 100 nm, and an upper Ta layer of the second low-resistance metal film 28 has a thickness of 35 nm to compensate for an undesired etching.

Figure 3D:
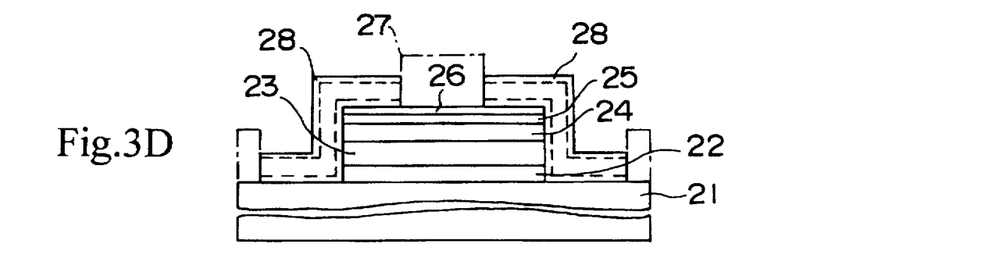

Thereafter, as shown in FIG. 3D, the second low-resistance metal film 28 formed on the patterned resists 27 is removed with the patterned resists 27 according to the lift-off technique. That is, the second low-resistance metal film 28 formed on the first low-resistance metal layer 26 and the substrate 21 remains in the leading electrode forming regions as a pair of patterned second low-resistance metal films.

Figure 3E:
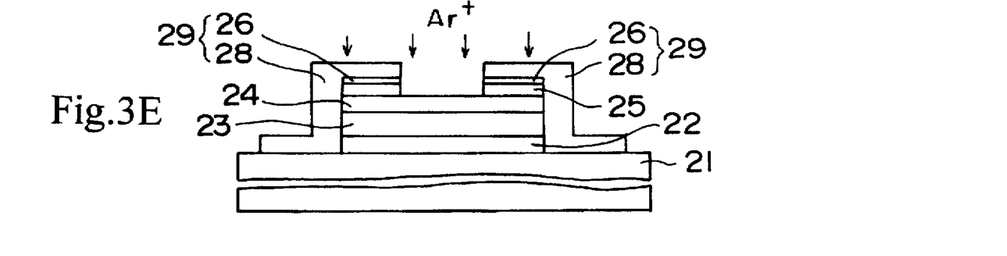

Thereafter, as shown in FIG. 3E, the anti-ferromagnetic ($Fe_{50}Mn_{50}$) layer 25 and the first low-resistance metal layer 26 placed on the sense region S are removed according to the ion milling technique while using the patterned second low-resistance metal films 28 as an etching mask, and a patterned first low-resistance metal layer 26 is formed. In this case, the upper Ta layer of the second low-resistance metal film 28 is also etched, and the upper Ta layer is thinned to a thickness of 10 nm. In the ion milling technique, argon (Ar) gas is used, an accelerating voltage for ions is set to 1 keV, and an ion current density is set to 1 mA/cm².

Therefore, a pair of leading electrodes 29 composed of the patterned first low-resistance metal layer 26 and the patterned second low-resistance metal films 28 are formed on both sides of the sense region S. In this case, the leading electrodes 29 are aligned in a direction agreeing with the magnetization direction determined by the applied magnetic field.

In the above manufacturing method, the formation of a magnetoresistive sensor used for the manufacturing of a magnetoresistive head is finished.

Accordingly, in the magnetoresistive sensor, because the anti-ferromagnetic layer 25 grows on the magnetoresistive layer 24 in succession to the growth of the magnetoresistive layer 24, there is no probability that a natural oxide is produced in a boundary region between the magnetoresistive layer 24 and the anti-ferromagnetic layer 25. Also, there is no probability that a film thickness of the magnetoresistive layer 24 placed under the anti-ferromagnetic layer 25 changes. Therefore, an exchange coupling magnetic field of the anti-ferromagnetic layer 25 for the magnetoresistive layer 24 can be stabilized, the Barkhausen noise can be suppressed, and a superior magnetoresistive effect characteristic can be stably obtained in the magnetoresistive sensor.

Also, because the anti-ferromagnetic layer 25 and the first low-resistance metal layer 26 are patterned by using the patterned second low-resistance metal films 28, of which the planar shape is the same as that of the leading electrodes 29, as an etching mask, the sense region S of the magnetoresistive layer 24 can be clearly determined along ends of the leading electrodes 29, and an area margin required to form the leading electrodes 29 can be minimized. Therefore, the magnetoresistive sensor can be downsized.

In addition, because the first low-resistance metal layer 26 composing the leading electrodes 29 is formed on only the anti-ferromagnetic layer 25, the first low-resistance metal layer 26 can be formed on the anti-ferromagnetic layer 25 in succession to the anti-ferromagnetic layer 25. Therefore, because the surface of the anti-ferromagnetic layer 25 is protected by the first low-resistance metal layer 26, any natural oxidized film is not formed on the surface of the anti-ferromagnetic layer 25, and any cleaning operation for cleaning the surface of the anti-ferromagnetic layer 25 is not required. In other word, because any etching operation for etching an upper portion of the anti-ferromagnetic layer 25 is not required, a film thickness of the anti-ferromagnetic layer 25 can be maintained to an initial thickness. Therefore, a more superior exchange coupling between the magnetoresistive layer 24 and the anti-ferromagnetic layer 25 can be obtained. Also, because an electrical contact resistance between the anti-ferromagnetic layer 25 and a group of leading electrodes 29 is reduced, the magnetoresistive sensor having a higher sensitivity can be obtained as compared with that obtained in the first embodiment.

In the second embodiment, because the leading electrodes 29 are used as an etching mask, the sense region S can be clearly determined. However, in cases where only the protection of the magnetic domain controlling magnetic layer 25 is required, a patterned resist can be used as the etching mask in place of the leading electrodes 29.

(Third Embodiment)

In the second embodiment, the anti-ferromagnetic layer 25 and the first low-resistance metal layer 26 placed on the sense region S are removed according to the ion milling technique while using the patterned second low-resistance metal films 28 as an etching mask. However, because the sense region S of the magnetoresistive layer 24 is exposed when the layers 25 and 26 are removed, there is a probability that the surface of the magnetoresistive layer 24 is oxidized and contaminated. Therefore, a method for protecting the surface of the magnetoresistive layer 24 without exposing the surface of the magnetoresistive layer 24 is described with reference to FIGS. 4A to 4C. A plurality of constructional elements indicated by a plurality of reference numerals in FIGS. 4A to 4C are the same as those indicated by the same reference numerals in FIGS. 3A to 3E.

Figure 4A:
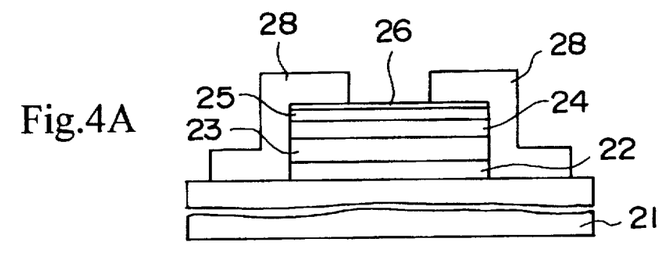
FIGS. 4A to 4C are cross-sectional views showing a plurality of steps for forming a plurality of films in a magnetoresistive sensor according to a third embodiment of the present invention.

As shown in FIG. 4A, the soft adjacent layer 22, the magnetic isolation layer 23, the magnetoresistive layer 24, the anti-ferromagnetic layer 25 and the first low-resistance metal layer 26 are successively formed on the substrate 21 in that order according to the RF sputtering and are patterned in the plane rectangular shape. Thereafter, the patterned second low-resistance metal films 28 are formed on both sides of the sense region S in the same manner as in the second embodiment (FIGS. 3A to 3D).

Figure 4B:
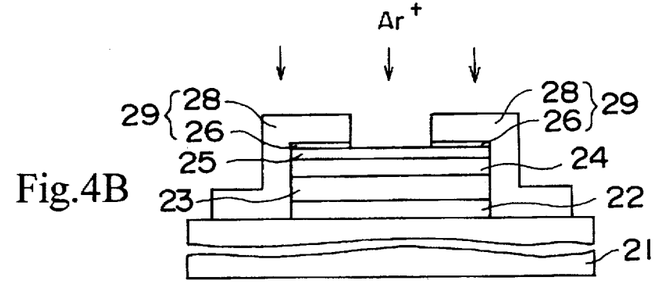
Figure 5A:
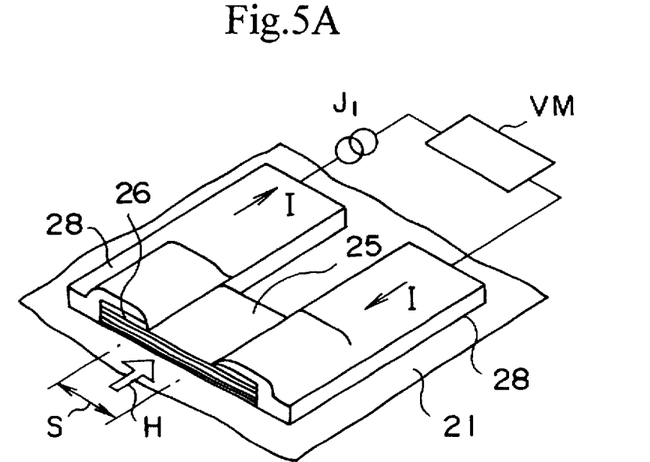
FIG. 5A is a perspective view showing a thinning of an anti-ferromagnetic layer according to the third embodiment of the present invention.

Thereafter, as shown in FIG. 4B and FIG. 5A, only the first low-resistance metal films 26 placed on the sense region S of the magnetoresistive layer 24 is removed according to the ion milling technique while using the patterned second low-resistance metal films 28 as an etching mask. Therefore, the pair of leading electrodes 29 are produced from the patterned first and second low-resistance metal films 26 and 28.

Figure 4C:
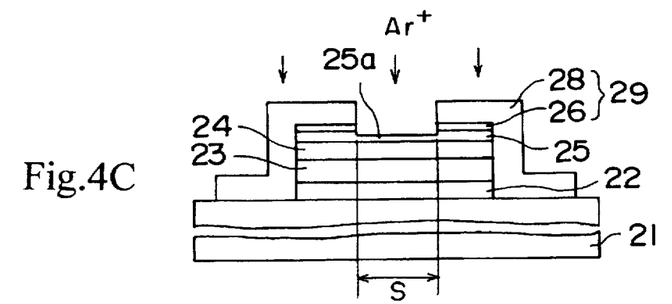

Thereafter, as shown in FIG. 4C, an upper portion of the anti-ferromagnetic layer 25 placed on the sense region S is removed according to the ion milling technique, and the anti-ferromagnetic layer 25 is gradually thinned until a magnetic exchange coupling between the magnetoresistive layer 24 and the anti-ferromagnetic layer 25 is broken. The thickness of the anti-ferromagnetic layer is thinned until about 5 nm or the less. Therefore, the anti-ferromagnetic layer 25 remaining on the sense region S functions as a protective layer for the magnetoresistive layer 24. In the ion milling technique, argon gas is used, an accelerating voltage for ions is set to 1 keV, and an ion current density is set to 1 mA/cm$^2$.

Figure 5B:
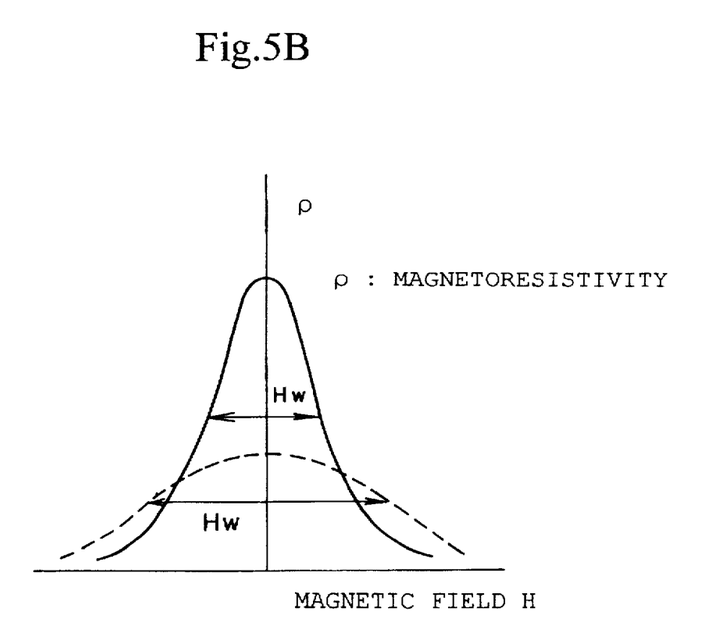
FIG. 5B is a changing of ρ-H curve (magnetoresistivity versus magnetic field) of a magnetoresistive sensor in an etching process for thinning the anti-ferromagnetic layer according to the third embodiment.

In an etching process for thinning the anti-ferromagnetic layer 25, the etching of the anti-ferromagnetic layer 25 is performed while measuring the change ρ of a magneto-resistivity of the magnetoresistive layer 24 for a magnetic field H (or a ρ-H curve) directed in a magnetizing difficult direction, as shown in FIG. 5A. When a curvature of the ρ-H curve starts to increase or increases by a desired value, that is, when a half-value width Hw of the ρ-H curve starts to decrease or increases by a desired value, the etching operation is stopped. The increase of the curvature of the ρ-H curve indicates that the exchange coupling between the magnetoresistive layer 24 and the anti-ferromagnetic layer 25 is broken and the magnetic sensitivity of the magnetoresistive layer 24 increases as shown in FIG. 5B. Therefore, a substantial film thickness of the anti-ferromagnetic layer 25 remaining on the sense region S can be controlled with very high precision by measuring the curvature of the ρ-H curve.

In FIG. 5A, the symbol J is a constant-current power supply, and the symbol VM is a voltmeter.

The phenomenon that an intensity of an exchange coupling magnetic field is reduced to zero when a film thickness of an anti-ferromagnetic layer becomes thinner than a prescribed film thickness is disclosed in J. Mag. Soc. Jpn., Vol. 17, No. 2, 1993 and Electric Information Communication Society Spring Nation Meeting C-428.

In the above steps of the manufacturing method, the magnetic characteristics of the sense region S of the magnetoresistive layer 24 in the magnetoresistive sensor is the same as those in another magnetoresistive sensor in which any anti-ferromagnetic layer is not arranged, and the anti-ferromagnetic layer 25 functions as only a protective film. Also, because the magnetoresistive layer 24 and the anti-ferromagnetic layer 25 successively grow in a vacuum, the surface of the magnetoresistive layer 24 can be maintained in a clean condition.

Accordingly, the magnetoresistive layer 24 is hardly oxidized after the anti-ferromagnetic layer 25 placed on the sense region S is thinned, and the magnetoresistive layer 24 is not contaminated.

Also, in cases where an etching volume of the anti-ferromagnetic layer (or the magnetic domain controlling magnetic layer) 25 is controlled, because the sense region S of the magnetoresistive layer 24 is protected without adding a new step, a through put for the magnetoresistive sensor is not lowered.

It is applicable that a film thickness of the anti-ferromagnetic layer 25 at which the exchange coupling magnetic field is decreased to zero be measured in advance and an etching volume of the anti-ferromagnetic layer 25 be controlled according to an etching speed and an etching time. Also, though the leading electrodes 29 is used as an etching mask in the third embodiment, it is applicable that a patterned resist be used as an etching mask in place of the leading electrodes 29.

(Fourth Embodiment)

The configuration of a magnetoresistive sensor, in which the magnetoresistive layer 24 is protected, an a manufacturing method of the device is described with reference to FIGS. 6A to 6C. A plurality of constructional elements indicated by a plurality of reference numerals in FIGS. 6A to 6C are the same as those indicated by the same reference numerals in FIGS. 3A to 3E.

Figure 6A:
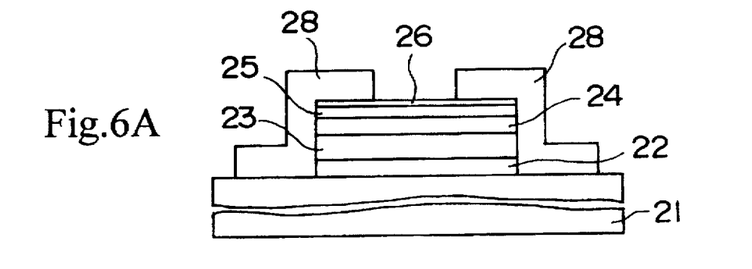
FIGS. 6A to 6C are cross-sectional views showing a plurality of steps for forming a plurality of films in a magnetoresistive sensor according to a fourth embodiment of the present invention.

As shown in FIG. 6A, the soft adjacent layer 22, the magnetic isolation layer 23, the magnetoresistive layer 24, the anti-ferromagnetic layer 25 and the first low-resistance metal layer 26 are successively formed on the substrate 21 in that order according to the RF sputtering and are patterned in the plane rectangular shape. Thereafter, the patterned second low-resistance metal films 28 are formed on both sides of the sense region S in the same manner as in the second embodiment (FIGS. 3A to 3D).

Figure 6B:
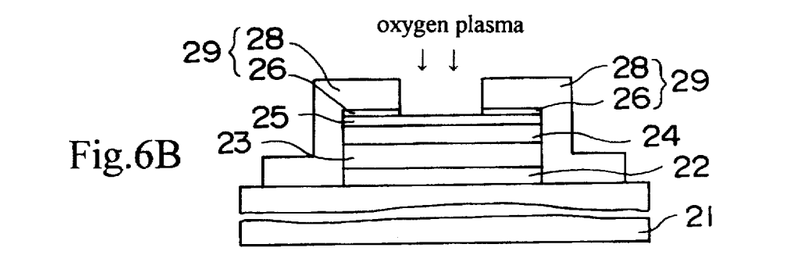

Thereafter, as shown in FIG. 6B, the first low-resistance metal films 26 placed on the sense region S of the magnetoresistive layer 24 is removed according to the ion milling technique while using the patterned second low-resistance metal films 28 as an etching mask. Therefore, the pair of leading electrodes 29 are produced from the patterned first and second low-resistance metal films 26 and 28. In the ion milling technique, argon gas is used, an accelerating voltage for ions is set to 1 keV, and an ion current density is set to 1 mA/cm².

Figure 6C:
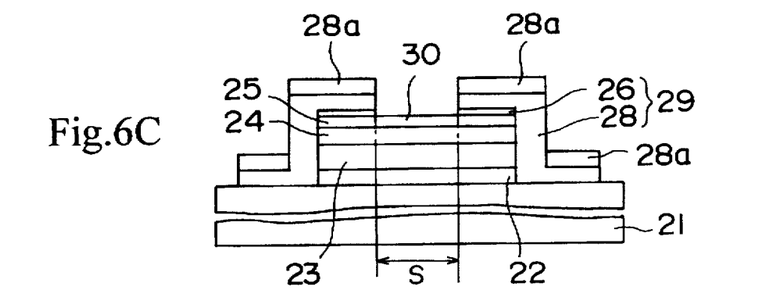

Thereafter, as shown in FIG. 6C, the anti-ferromagnetic layer 25 placed on the sense region S of the magnetoresistive layer 24 is oxidized by radiating oxygen plasma while using the leading electrodes 29 as an etching mask, so that the anti-ferromagnetic layer 25 is changed to a protective film 30 which is set in a magnetically non-active condition. The oxidation of the anti-ferromagnetic layer 25 by the oxygen plasma is performed in a vacuum of 0.05 torr. The oxygen plasma is excited by using a high frequency electric power of 13.56 MHz and 150 W. In this case, because upper layer portions of the patterned second low-resistance metal films 28 are also oxidized, the upper Ta layer of the second low-resistance metal film 28 is excessively thickened in advance to compensate for the etching performed by the oxygen plasma.

In the fourth embodiment, though the anti-ferromagnetic layer 25 placed on the sense region S is perfectly oxidized. However, it is not required to perfectly oxidize the anti-ferromagnetic layer 25. As is described in the third embodiment, it is sufficient to radiate the oxygen plasma until the exchange coupling magnetic field between the magnetoresistive layer 24 and the anti-ferromagnetic layer 25 is broken.

Also, as is described in the third embodiment, in cases where the anti-ferromagnetic layer 25 is thinned until the exchange coupling magnetic field in the sense region S is reduced to zero, it is applicable that the thinned anti-ferromagnetic layer 25 be oxidized by the oxygen plasma.

Also, as shown in FIG. 4C, in cases where the anti-ferromagnetic layer 25 placed on the sense region S is sufficiently thinned to be easily oxidized, thereafter it is applicable that the anti-ferromagnetic layer 25 be exposed to an oxygenic atmosphere and be oxidized.

Though the leading electrodes 29 is used as an etching and oxiding mask in the fourth embodiment, it is applicable that a patterned resist be used as an etching mask in place of the leading electrodes 29.

(Fifth Embodiment)

A magnetic head of a magnetic recording/reproducing drive which is manufactured from one of the magnetoresistive sensor described in the first to fourth embodiments and a magnetic recording medium are described with reference to FIG. 7.

Figure 7:
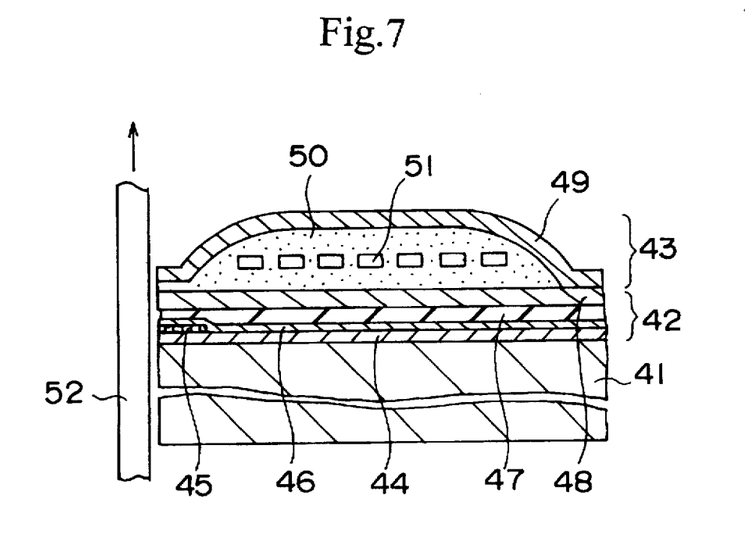
FIG. 7 is a cross-sectional view showing an important portion of a magnetic recording medium in which the magnetoresistive sensor according to the present invention is adopted.

As shown in FIG. 7, a reproducing head 42 and a recording head 43 placed on the substrate 41 are arranged adjacent to each other. The reproducing head 42 comprises a magnetoresistive sensor 45 arranged on a first magnetic shield layer 44 through an insulating film (not shown), a pair of leading electrodes (or a pair of leading terminals) 46 led from the magnetoresistive sensor 45, an insulating film 47 covering the magnetoresistive sensor 45 and the leading electrodes 46, and a second magnetic shield layer 48 arranged on the insulating film 47. The magnetoresistive sensor 45 and the leading electrodes 46 are selected from a group of the magnetoresistive sensor according to the first to fourth embodiments.

The recording head 43 comprises a third magnetic shield layer 49 placed on the second magnetic shield layer 48, an insulating layer 50 surrounded by the second and third magnetic shield layers 48 and 49, and a coil 51 buried in the insulating layer 50.

Each of the first, second and third shielding layers 44, 48 and 50 is made of a soft magnetic substance, and a group of the substrate 41 and the reproducing and recording heads 42 and 43 faces a magnetic recording medium 52 through a gap.

(Modification of the first to fourth embodiments)

In the first to fourth embodiments, the anti-ferromagnetic layers 15 and 25 are made of FeMn. However, even though, the anti-ferromagnetic layers 15 and 25 are made of NiMn, the same action and effect can be obtained in the magnetoresistive head. Also, a hard magnetic film made of Co, Cr, CoPt or CoCrPt can be used as the magnetic domain controlling magnetic layer 15 or 25 for controlling a magnetic domain of the sense region S of the magnetoresistive layer 14 or 24 in place of the anti-ferromagnetic layer. Also, because the magnetic isolation layer 13 or 23 is required to magnetically isolate the magnetoresistive layer 14 or 24 and the soft adjacent layer 12 or 22 from each other, it is applicable that the magnetic isolation layer 13 or 23 be made of a high-resistance metal such as tantalum (Ta) or titanium (Ti) or the other non-magnetic layer.

What is claimed is:

1. A magnetoresistive head, comprising:

a soft magnetic layer arranged on a substrate;

a magnetic isolation layer formed on said soft magnetic layer;

a magnetoresistive layer formed on said magnetic isolation layer;

a magnetic domain control layer directly formed on said magnetoresistive layer and made of an anti-ferromagnetic layer or a hard ferromagnetic layer, said magnetic domain control layer having a first end and a second end, a pair of electrode regions at both of said ends and a sense region between said pair of electrode regions, said pair of electrode regions having a first thickness for producing magnetic domain control for said magnetoresistive layer, and said sense region having a second thickness less than said first thickness so that said sense region of said magnetic domain control layer does not produce magnetic domain control for said magnetoresistive layer; and a pair of electrodes formed on said pair of electrode regions of said magnetic domain control layer.

2. A magnetoresistive head according to claim 1, wherein said pair of electrode regions of said magnetic domain control layer pin a magnetic domain direction of said magnetoresistive layer.

3. A magnetoresistive head according to claim 1, wherein said anti-ferromagnetic layer is made of FeMn or NiMn.

4. A magnetoresistive head according to claim 1, wherein said hard ferromagnetic layer is made of Co, Cr, CoPt, or CoCrPt.

5. A magnetoresistive head according to claim 1, wherein said pair of electrodes are made of an Au layer or a Ta-W-Ta layer.

6. a magnetoresistive head according to claim 1, further comprising:

a low-resistance metal layer formed on said magnetic domain control layer, said low-resistance metal layer reducing electrical contact resistance between said magnetic domain control layer and said magnetoresistive layer.

* * * * *